H. BARRY.
FOOD SLICER.
APPLICATION FILED OCT. 6, 1910.
1,013,361.
Patented Jan. 2, 1912.
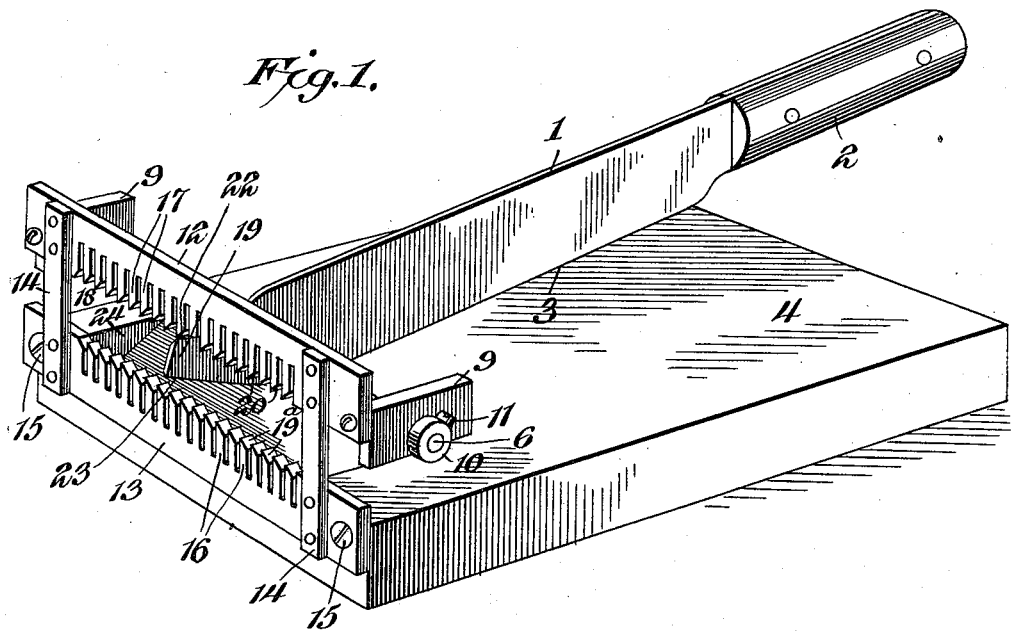
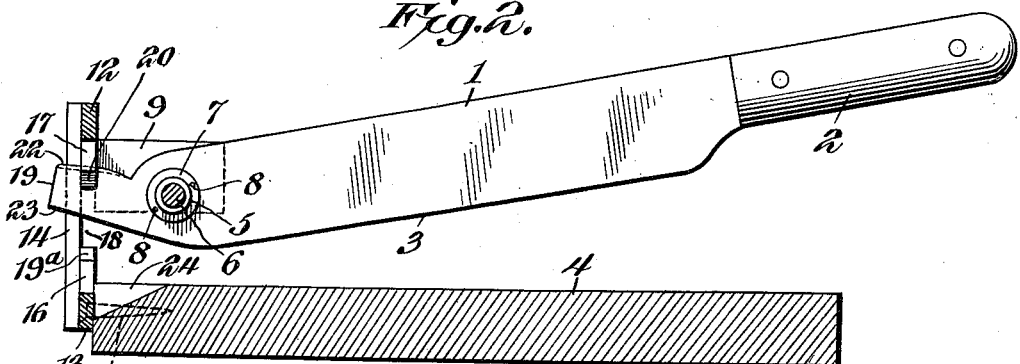
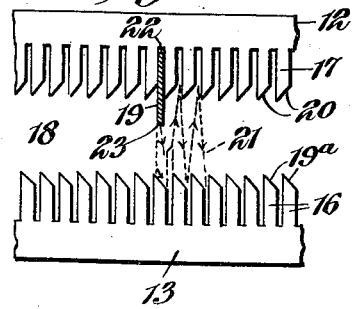
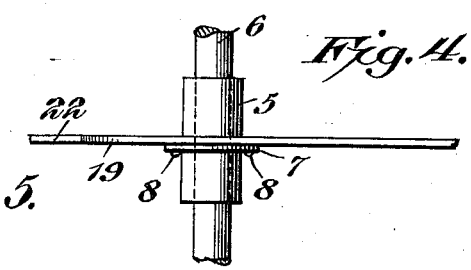
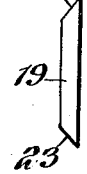
WITNESSES
*Henry Barry*, INVENTOR,
BY
ATTORNEY

UNITED STATES PATENT OFFICE.

HENRY BARRY, OF CHICAGO, ILLINOIS.

FOOD-SLICER.

1,013,361.  Specification of Letters Patent.  Patented Jan. 2, 1912.

Application filed October 6, 1910. Serial No. 585,698.

*To all whom it may concern:*

Be it known that I, HENRY BARRY, a citizen of the United States, residing at Chicago, in the county of Cook and State of Illinois, have invented a new and useful Food-Slicer, of which the following is a specification.

The invention relates to improvements in food slicers.

The object of the present invention is to improve the construction of food slicers, and to provide a simple, inexpensive and efficient one having an oscillatory knife, movable upwardly and downwardly and adapted to be raised to different elevations to suit the height of the food operated on, and having an automatic uniform lateral movement imparted to it, whereby it is capable of cutting slices of uniform thickness.

With these and other objects in view, the invention consists in the construction and novel combination of parts hereinafter fully described, illustrated in the accompanying drawing, and pointed out in the claims hereto appended; it being understood that various changes in the form, proportion, size and minor details of construction, within the scope of the claims, may be resorted to without departing from the spirit or sacrificing any of the advantages of the invention.

In the drawing:—Figure 1 is a perspective view of a food slicer, constructed in accordance with this invention. Fig. 2 is a longitudinal sectional view of the same. Fig. 3 is a detail view, illustrating the arrangement of the upper and lower racks and the knife. Fig. 4 is a detail view of a portion of the knife, illustrating the manner of slidably mounting the same. Fig. 5 is a detail view of the rear end of the knife.

Like numerals of reference designate corresponding parts in all the figures of the drawing.

In the embodiment of the invention illustrated in the accompanying drawing, 1 designates a vertically movable oscillatory knife, consisting of a straight blade and provided at one end with a suitable handle 2 and slidably and pivotally mounted adjacent to its other end and having a lower cutting edge 3, coöperating with a block 4 upon which is placed the material to be sliced. The knife is provided at its pivoted end with a transverse sleeve 5, slidably mounted on a transversely disposed rod or pivot 6 and having a collar 7, forming an abutment for the knife. The sleeve 5 projects laterally from opposite sides of the blade of the knife, which is suitably secured at one side of the collar 7 by rivets 8, or other suitable fastening means.

The transverse pivot 6 is mounted in alined openings of side supports 9, and is equipped at its ends with clamping collars 10, having set screws 11 and adapted to permit the pivot and the knife to be readily removed for sharpening the blade of the knife, for substituting one knife for another, or for any other purpose. The side supports consist of parallel plates, secured to an upper rack 12, which is supported in spaced relation with a lower rack 13 by vertical plates or bars 14, secured by rivets or other suitable fastening devices to the outer faces of the upper and lower racks 12 and 13, which are arranged in the same transverse plane. The lower rack is secured by screws 15, or other suitable fastening devices to the rear edge of the block, and it is provided at intervals with upwardly extending parallel vertical teeth 16. The upper rack 12 is provided with depending vertical parallel teeth 17, which are spaced from the teeth of the lower rack to provide a transverse opening or space 18 for the passage of an arm 19. The arm 19, which extends outwardly beyond the pivot of the knife, is arranged at a slight angle to the blade of the same, and in the vertical oscillation of the knife it coöperates with the teeth to move the knife automatically along the pivot in a direction transversely of the blade of the knife, whereby the material is cut in successive slices without feeding the material to the knife. The teeth 16 and 17 have beveled end edges 19ª and 20, and the beveled ends of the teeth of the racks are arranged in staggered relation, the beveled ends of the teeth of one rack being disposed opposite the slots or intervals between the teeth of the other rack, whereby when the knife is oscillated, the arm 19 will be alternately carried into contact with the beveled ends of the teeth of the upper and lower racks, as indicated by dotted lines 21, to secure the feeding movement of the knife simultaneously with the cutting operation of the same. The angularly disposed arm 19 has beveled upper and lower edges 22 and 23, the beveling being at the same side of the arm. The space between the upper and lower racks is of a height or width slightly in excess of the width of the arm 19 of the knife to permit the latter to slide along its pivot in returning it to its initial position after use. The blade of the knife is held against accidental lateral movement by the operation or movement of the arm 19 in the slots or spaces between the teeth, and the block 4 is beveled or cut-away at the back adjacent to the lower rack at 24 to form a recess for exposing the upwardly extending teeth of the lower rack.

Having thus fully described my invention, what I claim as new and desire to secure by Letters Patent, is:—

1. A slicer of the class described including a pivot, a straight knife mounted to oscillate and slide laterally thereon and provided with a projecting arm, and spaced racks having beveled teeth located in the path of the said arm, which engages between the teeth, whereby the knife is moved laterally.

2. A slicer of the class described including an oscillatory knife, means for slidably and pivotally mounting the knife, and spaced means arranged to be alternately engaged by the knife in the oscillation thereof for imparting automatic lateral movement to the knife, the space between the engaging means being of sufficient width to permit a direct sliding movement of the knife when the latter is brought to a position intermediate of the ends of its stroke.

3. A slicer of the class described including a pivot, an oscillatory knife slidably mounted on the pivot and having a projecting arm, and spaced engaging means located in the path of the arm and arranged to be alternately engaged by the same to impart an automatic lateral movement to the knife, the space between the engaging means being of a width slightly in excess of that of the arm to permit a direct sliding movement of the knife.

4. A slicer of the class described including an oscillatory knife, means for pivotally and slidably mounting the same, and spaced racks having beveled teeth arranged in staggered relation to automatically impart lateral movement to the knife during the oscillation thereof.

5. A slicer of the class described including a pivot, an oscillatory knife slidably mounted on the pivot and having a projecting portion extending beyond the pivot, spaced racks located in the path of the projecting portion of the knife and having beveled teeth arranged in staggered relation to automatically impart a lateral movement to the knife during the oscillation thereof.

6. A slicer of the class described including an oscillatory knife, means for pivotally and slidably mounting the knife, the latter having a projecting portion beveled at the opposite sides, and spaced racks having teeth co-acting with the said edges to impart a lateral movement to the knife during the oscillation thereof.

7. A slicer of the class described including an oscillatory knife, means for pivotally and slidably mounting the knife, the latter having a projecting portion beveled at the opposite sides, and spaced racks provided with beveled teeth arranged in staggered relation and co-acting with the beveled edges of the projecting portion of the knife to impart lateral movement to the same.

8. A slicer of the class described including a block, spaced upper and lower racks mounted on the block, supports located at opposite sides of the block, a transverse pivot mounted in the said supports and located in advance of the racks, and an oscillatory knife slidably mounted on the said pivot and having a projecting portion extending between the said racks and co-acting therewith to impart lateral movement to the knife.

9. A slicer of the class described including a block, spaced upper and lower racks mounted on the block, side supports securing and projecting from the upper rack and having alined openings, a pivot detachably secured within the alined openings of the support, and a knife having a sleeve sliding on the pivot, said knife extending between and coöperating with the upper and lower racks to impart a lateral movement to the knife.

In testimony, that I claim the foregoing as my own, I have hereto affixed my signature in the presence of two witnesses.

HENRY BARRY.

Witnesses:
WILLIAM COUGHLIN,
CHARLES P. FLANNIGAN.

Copies of this patent may be obtained for five cents each, by addressing the "Commissioner of Patents, Washington, D. C."